(12) United States Patent
Dearing et al.

(10) Patent No.: US 7,490,088 B2
(45) Date of Patent: Feb. 10, 2009

(54) APPARATUS, SYSTEM, AND METHOD FOR PRESERVING CONNECTION/POSITION DATA INTEGRITY DURING FILE SERVER SERIALIZATION REINITIALIZATION

(75) Inventors: Gerard Maclean Dearing, San Jose, CA (US); William Stuart Edwards, San Jose, CA (US); Elmer Enrique Latorre, San Jose, CA (US); Thomas Alexander Mahon, San Jose, CA (US); Lyle LeRoy Merithew, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/932,207

(22) Filed: Sep. 1, 2004

(65) Prior Publication Data

US 2006/0047687 A1 Mar. 2, 2006

(51) Int. Cl.
*G06F 17/30* (2006.01)
(52) U.S. Cl. ..................... 707/10; 707/3; 707/4; 707/5; 707/100; 707/102; 711/162; 709/203; 713/155
(58) Field of Classification Search ................ 707/3–5, 707/10, 100, 102; 711/162; 709/203; 713/155
See application file for complete search history.

(56) References Cited

U.S. PATENT DOCUMENTS

| | | | | |
|---|---|---|---|---|
| 5,095,421 A | 3/1992 | Freund | ....................... | 718/101 |
| 5,185,871 A * | 2/1993 | Frey et al. | ................... | 712/205 |
| 5,490,270 A | 2/1996 | Devarakonda et al. | ...... | 707/201 |
| 5,504,900 A | 4/1996 | Raz | ............................. | 707/10 |
| 5,664,088 A | 9/1997 | Romanovsky et al. | ........ | 714/13 |
| 5,752,060 A | 5/1998 | Yoshida | ....................... | 707/10 |
| 5,845,117 A | 12/1998 | Fujita | .......................... | 718/107 |
| 5,950,218 A | 9/1999 | Howard | ......................... | 711/4 |

(Continued)

OTHER PUBLICATIONS

Minwen Ji, "Atomicity, serialization and recovery in the island-based file sytem", INSPEC—6806009; Proceedings IEEE International Conference on Cluster Computing. Cluster 2000, pp. 369-370, Published: Los Alamitos, CA, USA, 2000.xxvii + 406 pp.

(Continued)

*Primary Examiner*—Khanh B. Pham
*Assistant Examiner*—Syling Yen
(74) *Attorney, Agent, or Firm*—Kunzler & McKenzie

(57) ABSTRACT

An apparatus, system, and method are disclosed for preserving connection/position data integrity during reinitialization of serialization information in a file server. The apparatus includes a completion rights module, a completion termination module, and a postponement module. The completion rights module grants a completion right to a sensitive process, which is characterized by an associated period of data instability. The completion termination module terminates a grant of the completion right to the sensitive process in anticipation of a reinitialization of a file server. The completion right may be terminated after the connection/position data is stable or, if necessary, in response to completion of a time out period. The postponement module postpones the reinitialization of the file server and the serialization information until after the completion rights are terminated. The apparatus, system, and method advantageously maintain the connection/position data stable during the file server reinitialization so that the connection/position data may be reliably used to rebuild the serialization information.

16 Claims, 7 Drawing Sheets

U.S. PATENT DOCUMENTS

| | | | | |
|---|---|---|---|---|
| 5,960,436 | A * | 9/1999 | Chang et al. | 707/101 |
| 6,115,710 | A * | 9/2000 | White | 707/10 |
| 6,192,389 | B1 | 2/2001 | Ault et al. | 718/101 |
| 6,351,744 | B1 * | 2/2002 | Landresse | 707/8 |
| 6,442,551 | B1 | 8/2002 | Ofek | 707/10 |
| 6,658,415 | B1 | 12/2003 | Brown et al. | 707/10 |
| 6,665,814 | B2 | 12/2003 | Hobson et al. | 714/16 |
| 6,732,124 | B1 * | 5/2004 | Koseki et al. | 707/202 |
| 6,751,617 | B1 | 6/2004 | Romanovsky et al. | 714/13 |
| 6,886,064 | B2 * | 4/2005 | Dawkins et al. | 710/200 |
| 6,920,467 | B1 * | 7/2005 | Yoshimoto | 707/202 |
| 6,928,488 | B1 * | 8/2005 | de Jong et al. | 709/246 |
| 6,957,221 | B1 * | 10/2005 | Hart et al. | 707/100 |
| 7,010,657 | B2 | 3/2006 | Lowe et al. | 711/165 |
| 7,039,915 | B2 | 5/2006 | Kavoori et al. | 718/104 |
| 2002/0023139 | A1 | 2/2002 | Hultgren | 709/216 |
| 2002/0032873 | A1 * | 3/2002 | Lordemann et al. | 713/201 |
| 2002/0066051 | A1 | 5/2002 | Hobson et al. | 714/16 |
| 2002/0078028 | A1 | 6/2002 | Lisanke | 707/1 |
| 2003/0120680 | A1 * | 6/2003 | Agrawal et al. | 707/103 R |
| 2003/0158862 | A1 | 8/2003 | Eshel et al. | 707/200 |
| 2003/0217310 | A1 * | 11/2003 | Ebsen et al. | 714/42 |
| 2003/0220967 | A1 | 11/2003 | Potter et al. | 709/203 |
| 2004/0015834 | A1 | 1/2004 | Mestre et al. | 717/106 |
| 2004/0025169 | A1 | 2/2004 | Wiser et al. | 719/315 |
| 2004/0064439 | A1 * | 4/2004 | Hinshaw et al. | 707/1 |
| 2004/0133591 | A1 | 7/2004 | Holenstein et al. | 707/102 |
| 2004/0172390 | A1 * | 9/2004 | Srivastava et al. | 707/3 |
| 2005/0010615 | A1 | 1/2005 | Cypher et al. | 707/201 |
| 2005/0071384 | A1 * | 3/2005 | Cotner et al. | 707/200 |
| 2005/0091231 | A1 * | 4/2005 | Pal et al. | 707/100 |
| 2005/0289558 | A1 | 12/2005 | Illowsky et al. | 719/318 |
| 2006/0129600 | A1 | 6/2006 | Ode | 707/104.1 |

OTHER PUBLICATIONS

Sandoz A, "Achieving high availability in a replicated file system by dynamically ordering transactions", INSPEC—3908329; Proceedings. The 10$^{th}$ International Conference on Distributed Computing Systems (Cat. No. 90CH2878-7), pp. 432-439, Published: Los Alamitos, CA, USA, 1990, xxi + 600 pp.

Gronvall G; Westerlund A; Pink S, "The design of a mulicast-based distributed file system", INSPEC—6231025; Operating Systems Review, spec. issue., pp. 251-264, Winter 1998.

Shian Hua Lin; Yueh Min Huang; Chi Nan Chen, "The design of a distributed file server based on distributed shared memory," INSPECT—5005038;1994 International Computer Symposium Conference Proceedings, Pt. vol. 2, pp. 1190-1196 vol. 2, Published: Hsinchu, Taiwan, 1994, 2 vol. Xvi+1310 pp.

* cited by examiner

300

320

APPARATUS, SYSTEM, AND METHOD FOR PRESERVING CONNECTION/POSITION DATA INTEGRITY DURING FILE SERVER SERIALIZATION REINITIALIZATION

BACKGROUND OF THE INVENTION

1. Field of the Invention

This invention relates to file servers and more particularly relates to preserving the integrity of connection/position data while reinitializing serialization data in a file server in response to a serialization failure.

2. Description of the Related Art

Serialization of a plurality of data access requests can be extremely complicated for data storage devices that are shared among multiple-processor file system servers. Serialization of the data access requests involves defining which applications are connected to which storage devices, or portions thereof, and what kind of access is provided for each application. For example, some applications are given exclusive access rights for certain write operations, while others may not receive exclusive access. Also, some applications may receive shared access rights for certain read operations on the shared data storage devices. By defining which applications are allowed which type of access at which times, the file system servers are able to prevent many data operation errors that would otherwise occur.

However, serialization techniques are not perfect and a serialization implementation may fail. A serialization failure may occur when read or write access to a requested data file or directory is not made available to a requesting application. For example, a serialization failure may occur when two applications are requesting data access rights to data that is exclusively assigned to the other application.

FIG. 1a shows one example of an application environment 10 in which a serialization conflict might occur. In particular, the illustrated application environment 10 includes a first application 12 and a second application 14. The first application 12 has exclusive rights (as shown by the solid arrow 16) to a first data file 18. Likewise, the second application 14 has exclusive rights (as shown by the solid arrow 20) to a second data file 22.

FIG. 1a also shows the first application 12 requesting access rights (as shown by the dashed arrow 24) to the second data file 22. Likewise the second application 14 may request access rights (as shown by the dashed arrow 26) to the first data file 18. In this case, a serialization "deadlock" failure occurs when neither the first application 12 nor the second application 14 can progress until the requested access rights are granted, but the requested access rights cannot be granted because the requested data files 18, 22 are already in use by the non-requesting applications 12, 14. When this type of serialization failure occurs, the file system server (not shown) may become nonresponsive and thereby unavailable because the applications 12, 14 continue to hold onto their existing access rights while requesting the additional access rights.

Although an internal serialization failure, by itself, does not compromise either the integrity of the data stored in the data files 18, 22 or the run-time states of the in-flight applications 12, 14, such a serialization failure can have drastic effects on the file system server. For instance, a serious serialization failure may occur where the file system is central to an operating system, such as when the ability to load programs from a file system is necessary for basic operating system functions. Furthermore, serialization failures can result in operating system outages, which can cause the failure of all in-flight application processing, including processing that is not directly related to the corresponding file system. Additionally, serialization failures may lead to excessive costs due to file system server downtime that impacts business-critical applications.

FIG. 1a also shows the first application 12 requesting access rights (as shown by the dashed arrow 24) to the second data file 22. Likewise the second application 14 may request access rights (as shown by the dashed avow 26) to the first data file 18. In this case, a serialization "deadlock" failure occurs when neither the first application 12 nor the second application 14 can progress until the requested access rights are granted, but the requested access rights cannot be granted because the requested data files 18, 22 are already in use by the non-requesting applications 12, 14. When this type of serialization failure occurs, the file system server (not shown) may become nonresponsive and thereby unavailable because the applications 12, 14 continue to hold onto their existing access rights while requesting the additional access rights.

Because conventional serialization management schemes typically solve serialization failures by restarting the file server, conventional techniques also fail to address how to maintain connection/position data integrity during the reinitialization of the file server. Rather, conventional serialization management schemes allow open file connections and other resource connections to fail while the file server is down. In other words, all open resource connections, whether for directories, sub-directories, directory entries, files, or other resources, are lost when the file server becomes nonresponsive.

From the foregoing discussion, it should be apparent that a need exists for an apparatus, system, and method for automatically preserving connection/position data integrity during reinitialization of serialization data after a file system serialization failure. Beneficially, such an apparatus, system, and method maintain the connection/position data in a stable state so that it may be used for reinitialization of file system serialization information. Additionally, such an apparatus, system, and method would be advantageous over conventional systems and methods by allowing such connection/position data to be used to rebuild the serialization information after reinitialization.

SUMMARY OF THE INVENTION

The present invention has been developed in response to the present state of the art, and in particular, in response to the problems and needs in the art that have not yet been fully solved by currently available file system servers. Accordingly, the present invention has been developed to provide an apparatus, system, and method for preserving connection/position data integrity during file server serialization reinitialization that overcome many or all of the above-discussed shortcomings in the art.

The apparatus to preserve connection/position data integrity during file server serialization reinitialization is provided with a logic unit containing a plurality of modules configured to functionally execute the necessary steps of preserving connection/position data integrity during file server serialization reinitialization. These modules in the described embodiments include a completion rights module, a completion termination module, a postponement module, a completion prevention module, and a completion monitor module.

In one embodiment, the completion rights module is configured to grant a completion right to a sensitive process. A sensitive process is characterized by an associated period of data instability of the connection/position information. The completion termination module is configured, in one embodiment, to terminate a grant of the completion right to the sensitive process in anticipation of a reinitialization of a file server. For example, the completion termination module may terminate a grant of a completion right to a task when the connection/position data associated with that task is stable. The postponement module is configured, in one embodiment, to postpone the reinitialization of the file server and serialization information until after the completion rights for all ongoing processes are terminated.

In one embodiment, the completion monitor module is configured to monitor the status of the sensitive process and to determine when the sensitive process is complete to a point that the associated connection/position information is stable. The completion termination module then may terminate the grant of a completion right in response to a completion of the sensitive process. Alternately, if necessary, the completion termination module may be configured to terminate the grant of a completion right in response to a completion of a quiesce phase or in response to an administrator override command. The completion prevention module, in one embodiment, is configured to deny the grant of the completion right during the quiesce phase.

A method of the present invention is also presented for preserving connection/position data integrity during file server serialization reinitialization. The method in the disclosed embodiments substantially includes the steps necessary to carry out the functions presented above with respect to the operation of the described apparatus and system. In one embodiment, the method includes granting a completion right to a sensitive process, terminating a grant of the completion right to the sensitive process in anticipation of a reinitialization of a file server, and postponing the reinitialization of the file server until after the termination of the completion right.

In a further embodiment, the method may include monitoring the sensitive process and determining when the sensitive process is complete. The method also may include terminating the grant of the completion right in response to completion of the sensitive process, completion of a quiesce phase, or initiation of an administrator override command. Still further, the method may include denying the grant of the completion right during a quiesce phase.

A signal bearing medium is also presented. In one embodiment the signal bearing medium tangibly embodies a program of machine-readable instructions executable by a digital processing apparatus to perform operations to preserve connection/position data integrity during file server serialization reinitialization, as described above with reference to the apparatus, system, and method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
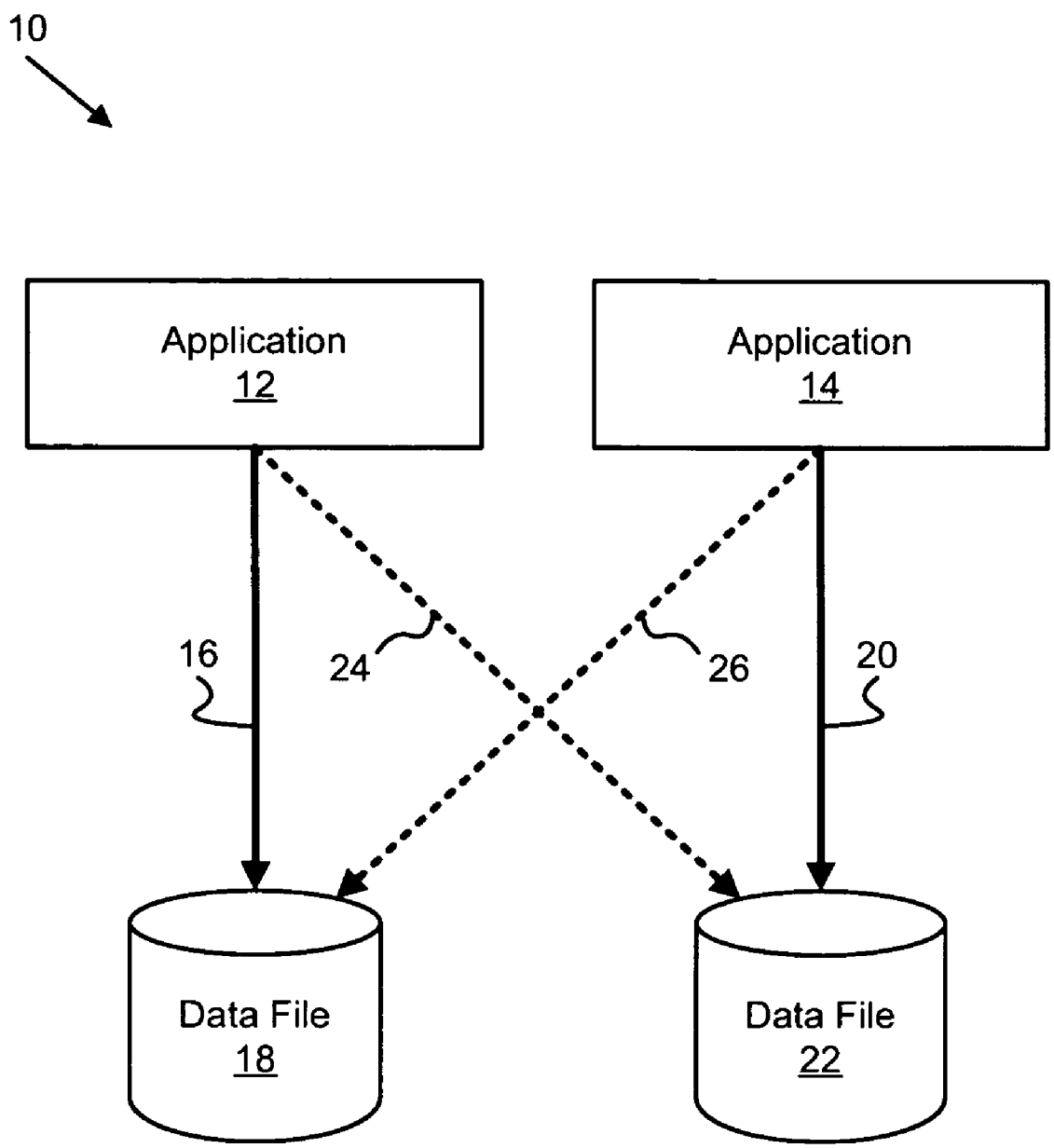
FIG. 1a is a schematic block diagram illustrating one embodiment of an application environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1B:
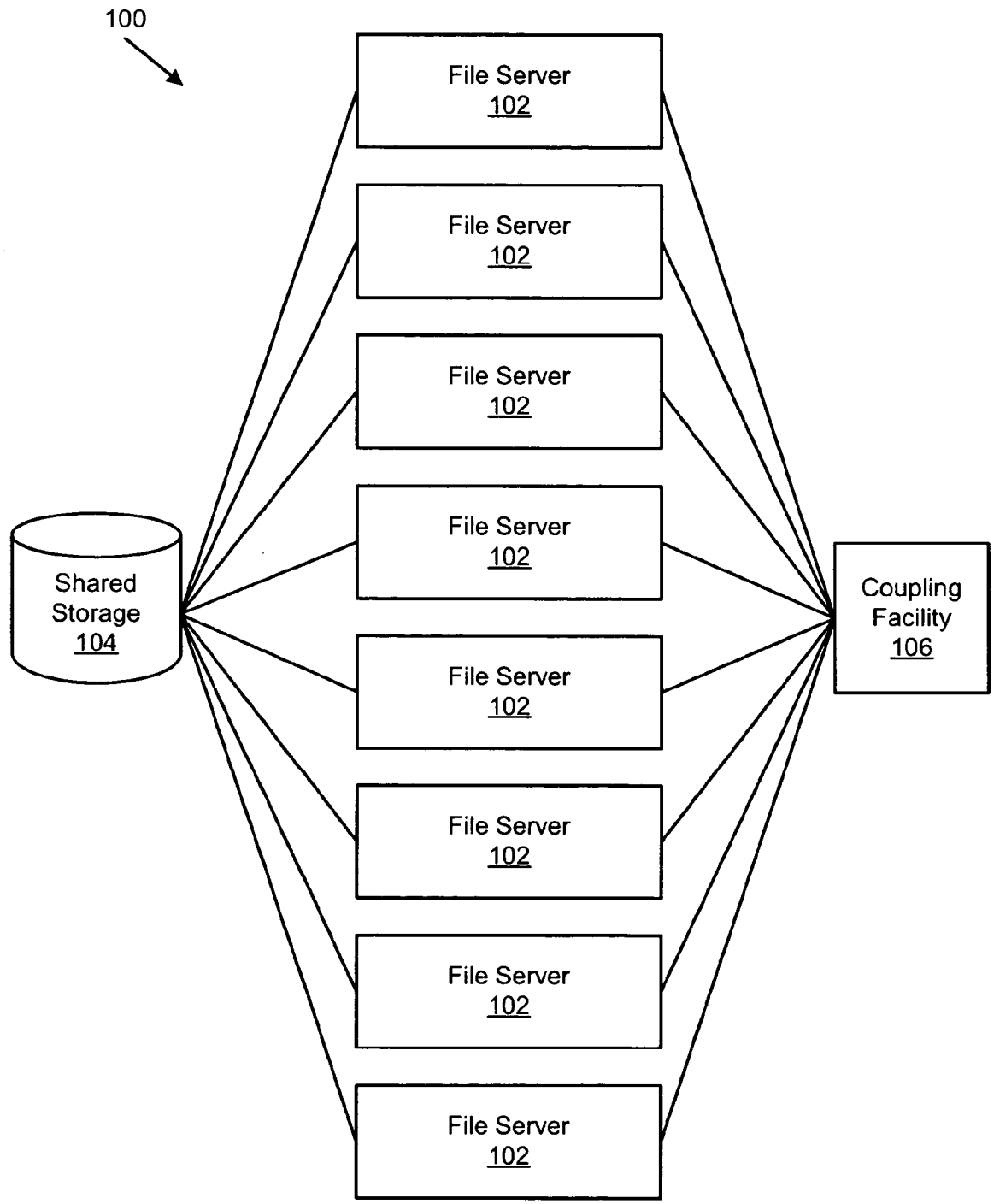
FIG. 1b is a schematic block diagram illustrating one embodiment of a storage system cluster in accordance with the present invention.

FIG. 1b depicts one embodiment of a processing cluster 100 in which certain embodiments of the present invention may be employed. The illustrated processing cluster 100 includes a plurality of file servers 102, one or more shared storage devices 104, and a coupling facility 106. Each file server 102 is configured to manage resources on the processing cluster 100. For example, the plurality of file servers 102 manages allocation of processing, memory, and data storage resources for each application or other software program executing on the processing cluster 100. As used herein, references to an "application" may include application software as well as system software, such as an operating system, unless indicated otherwise.

The shared storage devices 104 comprise electronic storage devices that are configured to store data per instructions from the plurality of file servers 102. In one embodiment, the shared storage devices 104 comprise a plurality of hard disk drives. Alternately, the shared storage devices 104 may comprise one or more optical drives, tape drives, and/or other data storage drives. Data stored on the shared storage devices 104 may be read and otherwise accessed by the file servers 102. In one embodiment, the data on the shared storage devices 104 may be stored within a file system including directories, sub-directories, files, and other directory entries. Each of the directories, sub-directories, files, other directory entries, and similar data structures is a shared storage resource within the processing cluster 100.

Each time an application on one of the file servers 102 requests access to data on one of the shared storage devices 104, the file server 102 coordinates the data access with other client applications running on the same file server 102 and on the other file servers 102 in the processing cluster 100. This coordination is referred to as serialization because the file server 102 allows serial, or consecutive, access to the data on the shared storage 104. Serialization allows each application to have either shared or exclusive access to a particular set of data so that other applications do not interfere with or otherwise disrupt the target set of data.

Serialization may be implemented on various levels of granularity within the processing cluster 100 and shared storage devices 104. For example, serialization may occur at a directory level or a sub-directory level. Additionally, serialization may occur at a file, record, or packet level. The serialization granularity depends on the type of processing cluster 100, file servers 102, shared data storage devices 104, and other hardware used within the processing cluster 100. The granularity also may depend on the type of data access operations that are requested by an application or an operating system.

The coupling facility 106, in one embodiment, is provided to facilitate serialization among all of the file servers 102 within the processing cluster 100. In particular, the coupling facility 106 may store serialization information and assist in messaging operations among the many file servers 102. Alternate embodiments of the processing cluster 100, however, may perform global serialization without the assistance of a coupling facility 106.

Figure 2:
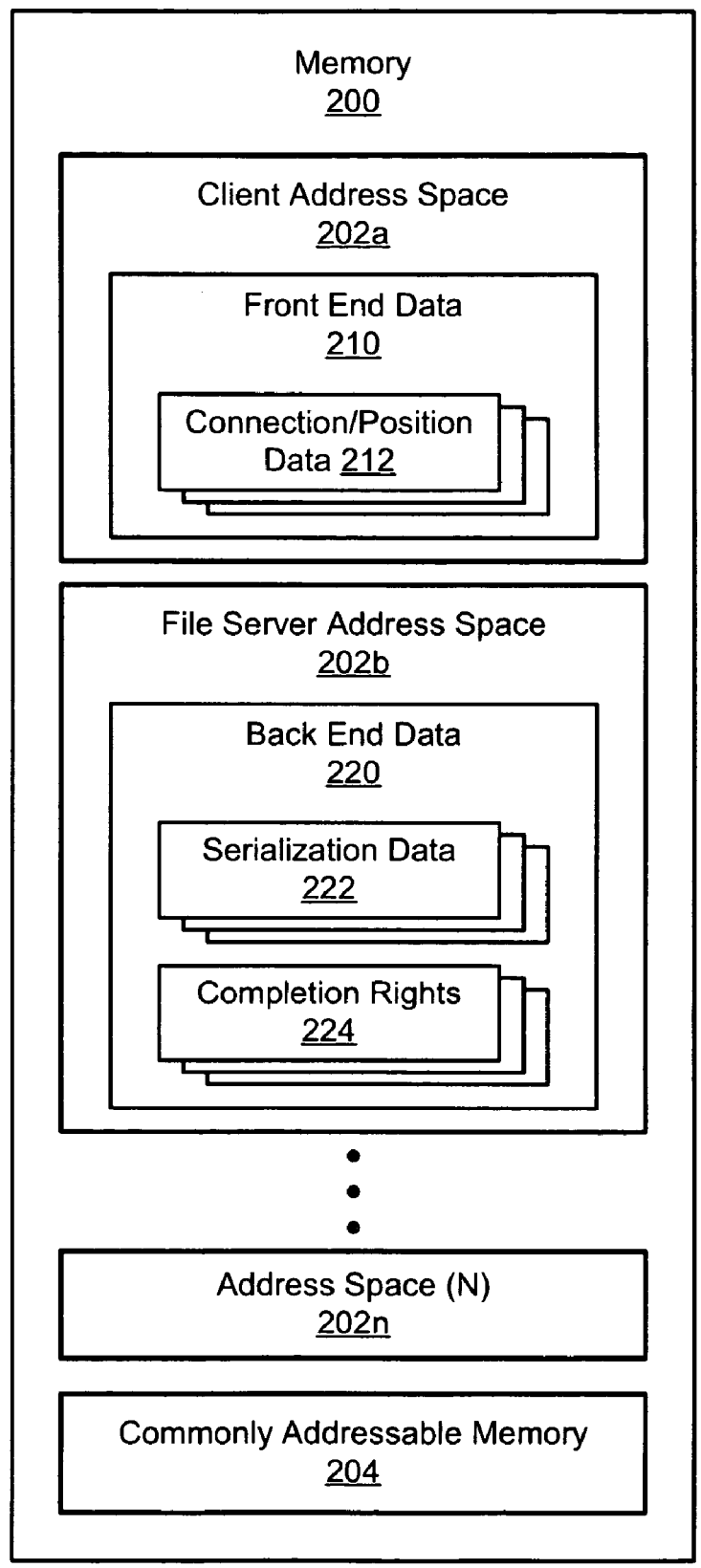
FIG. 2 is a schematic block diagram illustrating one embodiment of an electronic memory device in accordance with the present invention.

FIG. 2 depicts one embodiment of an electronic memory device 200 that may be used to store serialization programs and data, as well as related information. The illustrated memory 200 is divided into a plurality of address spaces 202. Each address space 202 comprises a set of legal memory addresses allocated for a given application and represents the amount of memory 200, either physical or virtual, that is allocated to the application. The illustrated memory 200 specifically includes a client address space 202a, a file server address space 202b, and additional address space(s) 202n. The memory 200 also includes commonly addressable memory 204.

A client address space 202a may be created for each application that interfaces with a given file server 102. For instance, a memory 200 may include four client address spaces 202a, one for each of four clients interfacing with the file server 102. The client address space 202a also may be referred to as the "front end" because it is responsible for interacting directly with the application programs. In general, the client address space 202a facilitates data access operations for the requesting software program, such as application software or system software.

The illustrated client address space 202a includes front end data 210, generally, and specifically includes connection/position data 212. Each client address space 202a may contain corresponding front end data 210, including connection/position data 212, pertinent to the associated client. The connection/position data is descriptive of the data on the shared storage devices 104 that is accessed by the corresponding application. An example of connection/position data 212 is described in more detail with reference to FIG. 3a.

References throughout this description to "a" or "the" client address space 202a in singular form is understood to refer to one or more client address spaces 202a, where each client address space 202a corresponds to an independent client. Similarly, references to front end data 210 and/or connection/position data 212 is understood to refer to such data for one or more clients interfacing with a given file server 102.

The file server address space 202b, in one embodiment, is responsible for serialization within the file server 102 and for data access to the shared storage devices 104. The file server address space 202b also may be referred to as the "back end" because it manages the interface between the file server 102 and the shared storage devices 104. In particular, the file server address space 202b serializes the data access requests for the application corresponding to the associated client address space 202a. These data access requests are serialized with other data access requests from other applications serviced by the same file server 102 and other file servers 102 within the processing cluster 100.

The illustrated file server address space 202b includes back end data 220, generally, and specifically includes serialization data 222. In further embodiments, the back end data 220 also may include completion rights 224, which may indicate the processing status of a data access request and/or the stability of the connection/position data 212 stored in the client address space 202a.

The additional address space(s) 202n may be used for similar programs and data as those stored in the client address space 202a and the file server address space 202b. The additional address space(s) 202n also may include a master address space, and so forth, as is currently known in the art.

The commonly addressable memory 204 is a portion of the memory 200 that may be used to store programs and data that are commonly accessible by one or more address spaces 202. For instance, the commonly addressable memory 204 may be used to store data, such as file names, or metadata that is commonly referenced by both the connection/position data 212 in the client address space 202a and the serialization data 222 in the file server address space 202b.

Figure 3A:
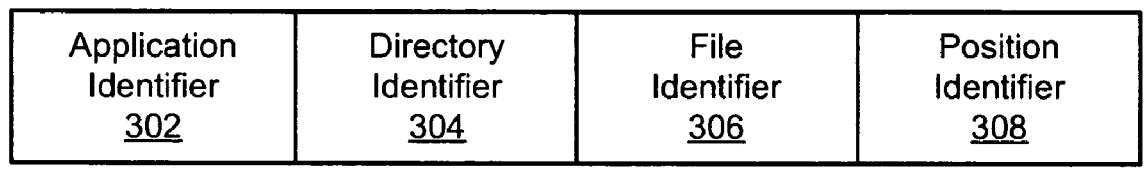
FIG. 3a is a schematic block diagram illustrating one embodiment of connection/position data in accordance with the present invention.

FIG. 3a depicts one embodiment of connection/position data 300 that is substantially similar to the connection/position data 212 described with reference to FIG. 2. The connection/position data 300 includes several fields that are each configured to store an identifier or other data to describe the connection and position information that is associated with a data access request corresponding to a particular application. The connection/position data 300 also may be referred to herein as connection/position information or connection/position records.

The illustrated connection/position data 300 includes an application identifier field 302, a directory identifier field 304, a file identifier field 306, and a position identifier field 308. In a further embodiment, the connection/position data 300 may include fewer or more data and/or metadata fields. In one embodiment, the application identifier field 302 stores an application identifier that identifies the application for which the client address space 202a exists.

The directory identifier field 304 stores a directory identifier that identifies a directory on the shared storage devices 104 that is being used for operations associated with the application identified by the application identifier. Similarly, the file identifier field 306 stores a file identifier that identifies a file that is being used for data access operations associated with the same application. In certain embodiments, the file identifier may relate to the directory identifier in that the file is a member of the directory. Given this relationship, the file identifier also may be referred to as a member identifier. The directory identifier and the file identifier may generally be referred to as resource identifiers. In alternate embodiments of the invention, other resource identifier fields and resource identifiers may be present within the connection/position data 300.

The position identifier field 308, in one embodiment, stores a position identifier that identifies the position at which the file or storage resource is currently or most recently accessed. In one embodiment, the position identifier may comprise a byte offset that indicates the current read or write position by a number of bytes from the beginning of the file that is being accessed.

Figure 3B:
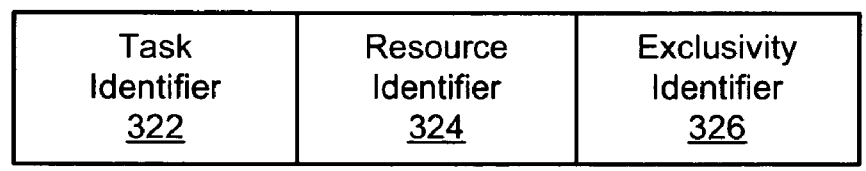
FIG. 3b is a schematic block diagram illustrating one embodiment of serialization data in accordance with the present invention.

FIG. 3b depicts one embodiment of serialization data 320 that is substantially similar to the serialization data 222 described above with reference to FIG. 2. The serialization data 320 includes several fields that are each configured to store an identifier or other data to describe the serialization information that is associated with a data access request corresponding to a particular task. A task is one data access operation that is associated with a particular application. An application may generate one or many tasks. The serialization data 320 also may be referred to herein as serialization information or serialization records.

The illustrated serialization data 320 includes a task identifier field 322, a resource identifier field 324, and an exclusivity identifier field 326. In a further embodiment, the serialization data 320 may include fewer or more data and/or metadata fields. In one embodiment, the task identifier field 322 stores a task identifier that identifies the task that is executed within the file server address space 202b.

In one embodiment, the resource identifier field 324 stores a resource identifier that identifies either an input resource or an output resource associated the task identified by the task identifier. In one embodiment, the resource identifier may identify an input resource, such as a shared storage device 104, from which data may be input into the task operation. For instance, the task operation may read data from a shared storage device 104. In a further embodiment, the resource identifier may identify an output resource, such as a buffer or an output area on a disk, to which data may be sent according to the task operation.

The exclusivity identifier field 326 stores an exclusivity identifier that identifies the type of resource exclusivity provided for the identified task to the identifier resource. For example, the task may have either shared or exclusive read access to a target data set to be read from the shared storage devices 104. In many instances, though not all, the exclusivity identifier provides shared access for data read (input) operations. In a further example, the task may have exclusive write access to a target buffer, or an output area on disk, on which data may be written. In many instances, though not all, the exclusivity z identifier provides exclusive access for data write (output) operations.

Figure 4:
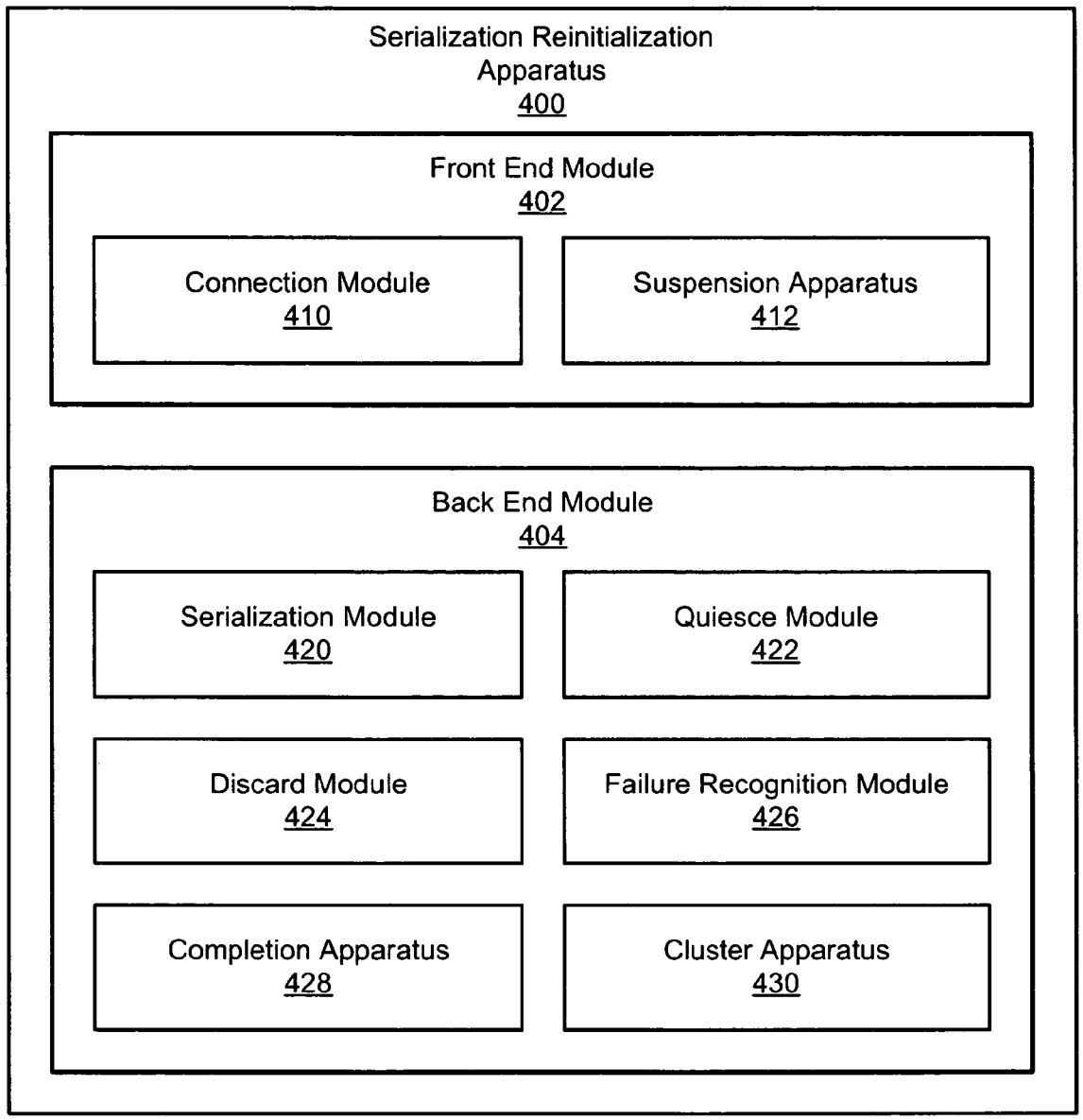
FIG. 4 is a schematic block diagram illustrating one embodiment of a serialization reinitialization apparatus in accordance with the present invention.

FIG. 4 depicts one embodiment of a serialization reinitialization apparatus 400 that may be used in conjunction with various embodiments of the present invention. The illustrated serialization reinitialization apparatus 400 includes a front end module 402 and a back end module 404. In one embodiment, the front end module 402 and the back end module 404 are software programs that reside in the client address space 202a and file server address space 202b, respectively.

The serialization reinitialization apparatus 400 is configured to reinitialize the serialization data 222 of the file server 102 in response to a serialization error or failure. As described above, a serialization failure may occur when one or more applications cannot properly access stored data that is necessary for completion of an operation. For example, referring back to FIG. 1, a file server 102 may be waiting for a first application 12 having exclusive access rights to a data file 18 to conclude an operation before allowing a second application 14 to have access rights to the same data file 18.

When serialization data 222 within a file server 102 or among a plurality of file servers 102 within a processing cluster 100 fails, the file server 102 or processing cluster 100 may become unavailable. For example, a file server 102 may become nonresponsive or "deadlocked" when two applications 12, 14 attempt to access data that is exclusively reserved for each other. By reinitializing the serialization data 222 of the file server 102, the serialization reinitialization apparatus 400 discards the existing serialization information 222 and reconstructs new serialization information from the connection/position data 212, thereby correcting any serialization failures.

Referring back to FIG. 4, the front end module 402, in one embodiment, includes a connection module 410 and a suspension apparatus 412. The connection module 410 is configured to monitor and record the connection/position data 212 for each task associated with an application. The suspension apparatus 412 is configured, in one embodiment, to suspend data access requests while the serialization data 222 for the file server 102 is being reinitialized. In one embodiment, the suspension apparatus 412 suspends the data access requests during a quiesce period prior to the serialization reinitialization, as well as during the serialization reinitialization.

The back end module 404, as illustrated, includes a serialization module 420, a quiesce module 422, a discard module 424, a failure recognition module 426, a completion apparatus 428, and a cluster apparatus 430. The serialization module 420, in one embodiment, is configured to manage the serialization data 222 for the file server 102. Additionally, the serialization module 420 may rebuild the serialization data 222 from the connection/position data 212 in conjunction with a serialization reinitialization of the file server 102.

The quiesce module 422 is configured, in one embodiment, to define and implement a quiesce period prior to a reinitialization of the serialization data 222 of the file server 102. In certain embodiments, the quiesce period may be a few seconds. Alternately, the quiesce period may be longer or shorter than a few seconds. During the quiesce period, the back end module 404 may deny new data access requests from the front end module 402. Additionally, the quiesce period may be used to allow ongoing tasks to complete prior to serialization reinitialization. Furthermore, ongoing tasks may be suspended or otherwise postponed during the quiesce period in order to maintain the integrity of the connection/position data 212 stored in the client address space 202a.

The discard module 424, in one embodiment, is configured to discard the existing serialization data 222 in conjunction with a serialization reinitialization of the file server 102. In certain embodiments, for example, the discard module 424 may request that the operating system simply destroy all of the information, programs, and data stored in the file server address space 202b, or back end. In other words, the operating system may be invoked to delete the back end data 220, including the existing serialization data 222 and the completion rights 224. Furthermore, the operating system may entirely discard the back end module 404, including the serialization module 420, the quiesce module 422, the discard module 424, the failure recognition module 426, the completion apparatus 428, and the cluster apparatus 430. Each of these back end modules, apparatuses, and data may be rebuilt during the serialization reinitialization.

The failure recognition module 426 is configured, in one embodiment, to recognize a serialization failure within the file server 102. In a further embodiment, the failure recognition module 426 may recognize a global serialization failure, for example in conjunction with the coupling facility 106. In an alternate embodiment, a human operator may recognize a situation in which the file server 102 is nonresponsive and explicitly issue a command on a system console keyboard (not shown) to initiate the reinitialization process. In this case, the operator may use diagnostic aids to help make such a determination.

The completion apparatus 428 is configured, in one embodiment, to track the completion progress of a task. In one embodiment, the completion apparatus 428 may create and use the completion rights 224 within the back end data 220 to track the progress of a task. One example of a completion apparatus 428 is described in more detail with reference to FIG. 5. The cluster apparatus 430, in one embodiment, is configured to manage communication and operations of the processing cluster 100 during serialization reinitialization of one of the plurality of file servers 102.

Figure 5:
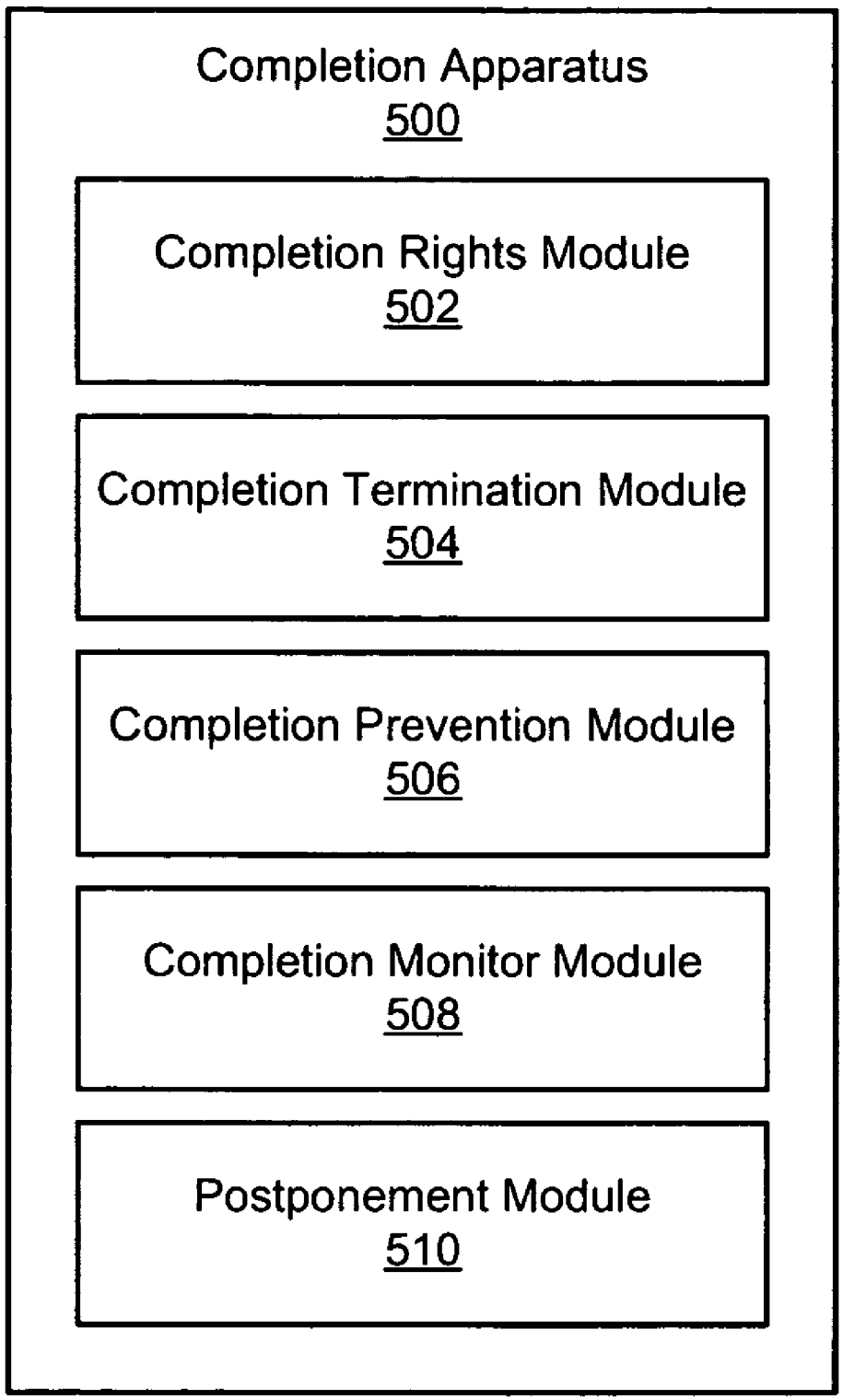
FIG. 5 is a schematic block diagram illustrating one embodiment of a completion apparatus in accordance with the present invention.

FIG. 5 depicts one embodiment of a completion apparatus 500 that is given by way of example of a completion apparatus 428 of FIG. 4. The illustrated completion apparatus 500 includes a completion rights module 502, a completion termination module 504, a completion prevention module 506, a completion monitor module 508, and a postponement module 510. In one embodiment, the completion apparatus 500 is located in the back end module 404 so that it is destroyed when the back end module 404 is destroyed during the reinitialization process. Alternately, the completion apparatus 500 may be located in the front end module 402 or in another address space 202n within the memory 200.

In one embodiment, the completion rights module 502 assigns and tracks completion rights 224 for one or more open resource connections. For example, a completion right 224 may be requested by an application task when the data access operation performed by the application task is a sensitive process. As used herein, a "sensitive process" is a data access operation that presents a period of time in which the connection/position data 212 may be unstable. The sensitive process may be inclusive of one or more operations within a single task, in one embodiment, or may be an entire task, in another embodiment.

By granting a completion right 224 to a sensitive process, the completion rights module 502 and completion apparatus 500 insure that a serialization reinitialization will not occur until the completion right 224 is returned. This means that the connection/position data 212 associated with that particular data access operation is known to be stable. In one embodiment, the completion monitor module 508 monitors the progress of the sensitive process to determine when the sensitive process is complete. In a further embodiment, the postponement module 510 is configured to postpone the serialization reinitialization until all completion rights 224 are returned and the connection/position data 212 for all potential data access operations is stable.

The completion termination module 504, in one embodiment, terminates a grant of a completion right 224 to a sensitive process. For example, the completion termination module 504 may terminate the grant of a completion right 224 after a sensitive process is completed. In another example, the completion termination module 504 may terminate the grant of a completion right 224 during or at the end of a quiesce period, as described above. In a further example, the completion termination module 504 may terminate the grant of a completion right 224 in response to a command from a system administrator, such as a human operator.

The completion prevention module 506 is configured, in one embodiment, to prevent the grant of a completion right 224 to a task or sensitive process. For instance, the completion prevention module 506 may prevent the grant of a completion right 224 to a sensitive process during the quiesce period. In this way, sensitive processes that might alter the connection/position data 212 or otherwise affect the stability of the connection/position data 212 may be prevented from executing during the quiesce phase and during reinitialization of the serialization information. In one embodiment, data access operations that are not granted completion rights 224 may be delayed or otherwise suspended by the suspension apparatus 412.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
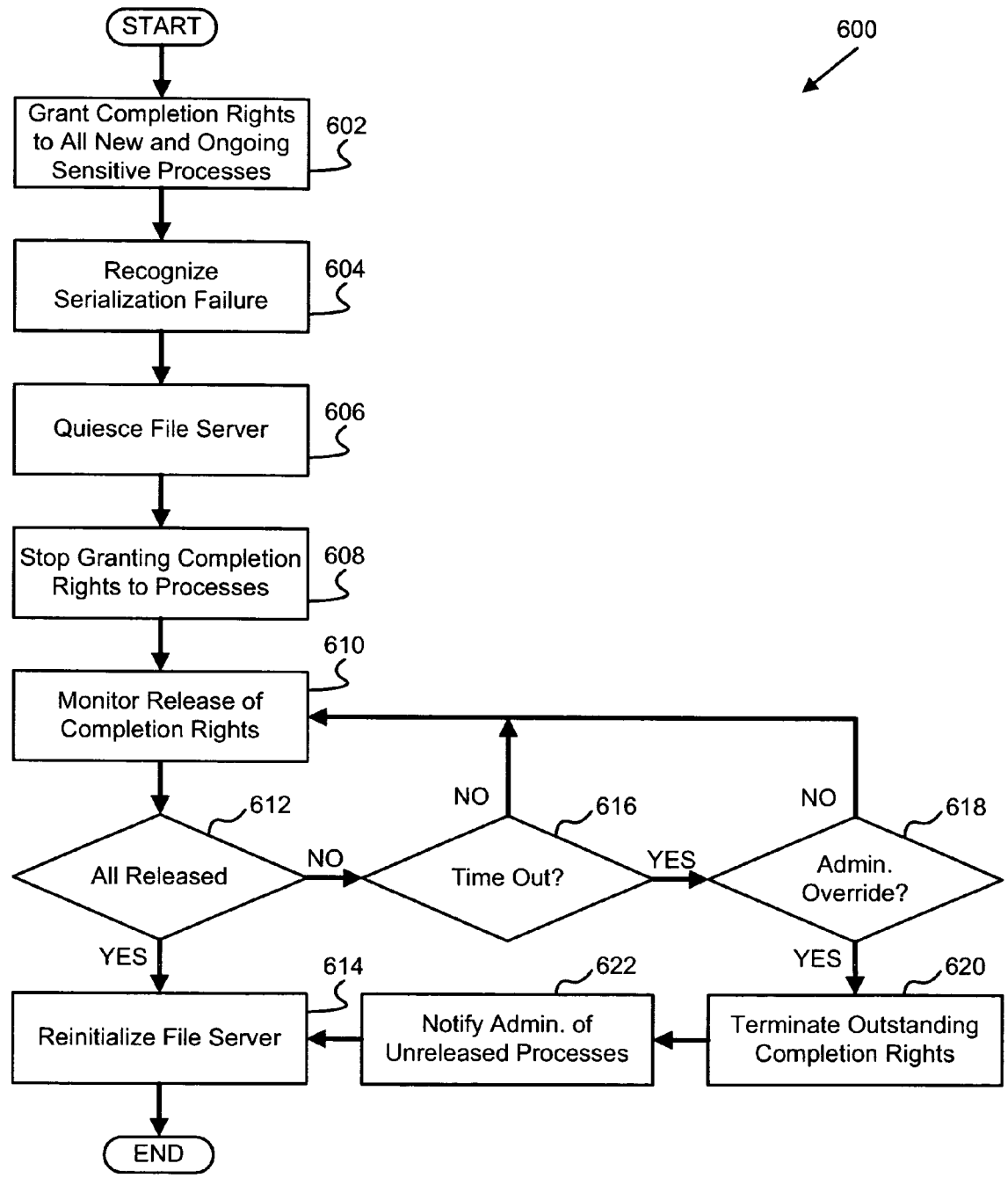
FIG. 6 is a schematic flow chart diagram illustrating one embodiment of a completion method in accordance with the present invention.

FIG. 6 depicts one embodiment of a completion method 600 that may be implemented by the completion apparatus 500 to control a plurality of completion rights 224 that may be granted and monitored in relation to a serialization reinitialization. The illustrated completion method 600 begins when the completion rights module 502 grants 602 completion rights 224 to all new and ongoing sensitive processes. In one embodiment, the completion rights 224 may be granted in anticipation of a serialization reinitialization. Alternately, the completion rights 224 may be granted at all times to all sensitive processes, barring prevention by the completion prevention apparatus 506, regardless of serialization reinitialization.

In the depicted embodiment, the failure recognition module 426 at some point recognizes 604 a serialization failure. In an alternate embodiment, the completion rights module 502 may begin granting 602 completion rights 224 after the serialization failure is recognized 604. In any case, once a serialization failure is recognized 604, the quiesce module 422 may institute 606 a quiesce phase prior to reinitialization of the serialization data 222. During that quiesce phase, the completion rights module 502 stops 608 granting completion rights 224 to new sensitive processes. In one embodiment, the completion prevention module 506 may prevent such completion rights 224 from being granted.

Still during the quiesce phase, the completion monitor module 508 monitors 610 the status of each of the sensitive processes that have been granted completion rights 224. As stated above, the postponement module 510 postpones reinitialization of the serialization data 222 until after all of the completion rights 224 have been returned and the connection/position data 212 is stable. As a sensitive process is completed, the task holding the corresponding completion right 224 releases the completion right 224 and the completion rights module 502 terminates the corresponding outstanding completion right 224 grant.

In one embodiment, the completion monitor module 508 and the completion rights module 502 determine 612 if all of the previously outstanding completion rights 224 have been released by their respective sensitive processes. When all of the completion rights 224 have been released and the corresponding completion rights 224 terminated, the serialization reinitialization apparatus 224 may reinitialize 614 the file server 102.

In one embodiment, the completion monitor module 508 may time out 616 while monitoring 610 the status of the granted completion rights 224 and waiting for the completion rights 224 to be terminated. The completion monitor module 508 continues to monitor 610 the status of the completion rights 224 until the completion monitor module 508 times out 616. Once the completion monitor module 508 times out 616, the completion termination module 504 may determine 618 if an administrator decides to override the continued monitoring 610 and, if so, terminates 620 any outstanding completion rights 224 and notifies 622 the administrator of the outstanding completion rights 224 that are terminated 620. Any completion rights 224 that are terminated 620 in this manner, may present unstable connection/position information 212 that may need to be scrutinized or otherwise verified prior to rebuilding the serialization data 222 during reinitialization of the file server 102.

From the foregoing discussion, it should be apparent that various embodiments of the present invention beneficially maintain the connection/position data 212 stable while the serialization information 222 is reinitialized. Additionally, certain embodiments of the presented apparatus, system, and method advantageously allow such connection/position data 212 to be used to rebuild the serialization information 222 during reinitialization of the file server 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to preserve connection/position data integrity during file server serialization reinitialization, the apparatus comprising:

an electronic memory device to store serialization programs and data, the electronic memory device comprising a client address space and a file server address space, the client address space comprising front end data comprising connection/position data, the file server address space comprising backend data comprising serialization data and completion rights;

a completion rights module configured to grant a completion right to a sensitive process after a serialization failure, the sensitive process characterized by an associated period following a data access and prior to a serialization data update;

a quiesce module configured to initiate a quiesce phase in response to the serialization failure, the quiesce phase comprising a duration of time prior to reinitialization of a file server;

a completion termination module configured to terminate a grant of the completion right to the sensitive process in anticipation of the reinitialization of the file server;

a postponement module configured to postpone the reinitialization of the file server until after termination of all granted completion rights, maintaining the connection/position data in a stable state; and a serialization module configured to manage the serialization data and rebuild the serialization data after the reinitialization from the connection/position data, wherein the serialization data comprises a task identifier, a resource identifier, and an exclusivity identifier and the connection/position data comprises an application identifier, a directory identifier, a file identifier, and a position identifier.

2. The apparatus of claim 1, further comprising a completion monitor module configured to monitor the sensitive process and to determine when the sensitive process is complete.

3. The apparatus of claim 1, wherein the completion termination module is further configured to terminate the grant of the completion right in response to a completion of the sensitive process.

4. The apparatus of claim 1, wherein the completion termination module is further configured to terminate the grant of the completion right in response to a completion of a quiesce phase.

5. The apparatus of claim 1, wherein the completion termination module is further configured to terminate the grant of the completion right in response to an administrator ovenide command.

6. The apparatus of claim 1, further comprising a completion prevention module configured to deny the grant of the completion right during a quiesce phase.

7. An electronic storage medium tangibly embodying a program of machine-readable instructions executed by a digital processing apparatus to perform operations to preserve connection/position data integrity during file server serialization reinitialization, the instructions comprising operations to:

maintain an electronic memory device comprising a client address space and a file server address space, the client address space comprising front end data comprising connection/position data, the file server address space comprising backend data comprising serialization data and completion rights;

grant a completion right to a sensitive process after a serialization failure, the sensitive process characterized by an associated period following a data access and prior to a serialization data update;

initiate a quiesce phase in response to the serialization failure, the quiesce phase comprising a duration of time prior to reinitialization of a file server;

terminate a grant of the completion right to the sensitive process in anticipation of the reinitialization of the file server; and postpone the reinitialization of the file server until after termination of all granted completion rights maintaining connection/position data in a stable state;

manage the serialization data;

rebuild the serialization data after the reinitialization from the connection/position data, wherein the serialization data comprises a task identifier, a resource identifier, and an exclusivity identifier and the connection/position data comprises an application identifier, a directory identifier, a file identifier, and a position identifier.

8. The electronic storage medium of claim 7, wherein the instructions further comprise operations to monitor the sensitive process and to determine when the sensitive process is complete.

9. The electronic storage medium of claim 7, wherein the instructions further comprise operations to terminate the grant of the completion right in response to a completion of the sensitive process.

10. The electronic storage medium of claim 7, wherein the instructions further comprise operations to terminate the grant of the completion right in response to a completion of the quiesce phase.

11. The electronic storage medium of claim 7, wherein the instructions further comprise operations to terminate the grant of the completion right in response to an administrator override command.

12. The electronic storage medium of claim 7, wherein the instructions further comprise operations to deny the grant of the completion right during the quiesce phase.

13. A method for preserving connection/position data integrity during file server serialization reinitialization, the method comprising:

maintaining an electronic memory device comprising a client address space and a file server address space, the client address space comprising front end data comprising connection/position data, the file server address space comprising backend data comprising serialization data and completion rights;

granting a completion right to a sensitive process after a serialization failure, the sensitive process characterized by an associated period following a data access and prior to a serialization data update;

initiating a quiesce phase in response to the serialization failure, the quiesce phase comprising a duration of time prior to the reinitialization of a file server;

terminating a grant of the completion right to the sensitive process in anticipation of a reinitialization of the file server;

postponing the reinitialization of the file server until after a termination of all granted completion rights maintaining connection/position data in a stable state;

managing the serialization data;

rebuilding the serialization data after the reinitialization from the connection/position data, wherein the serialization data comprises a task identifier, a resource identifier, and an exclusivity identifier and the connection/position data comprises an application identifier, a directory identifier, a file identifier, and a position identifier; and reinitializing the serialization data in the file server address space after the postponing of the reinitialization of the file server, the file server address space associated with the file server.

14. The method of claim 13, further comprising monitoring the sensitive process and determining when the sensitive process is complete.

15. The method of claim 13, further comprising terminating the grant of the completion right in response to one event selected from a completion of the sensitive process, a completion of the quiesce phase, and an administrator override command.

16. The method of claim 13, further comprising denying the grant of the completion right during the quiesce phase.

* * * * *